(12) United States Patent  
Yi et al.

(10) Patent No.: US 9,800,642 B2  
(45) Date of Patent: *Oct. 24, 2017

(54) COMMUNICATION OF MULTIMEDIA DATA STREAMS OVER MULTIPLE COMMUNICATION LANES

(71) Applicant: Lattice Semiconductor Corporation, Portland, OR (US)

(72) Inventors: Ju Hwan Yi, Sunnyvale, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,992

(22) Filed: Nov. 21, 2016

(65) Prior Publication Data

US 2017/0078356 A1   Mar. 16, 2017

Related U.S. Application Data

(63) Continuation of application No. 14/253,808, filed on Apr. 15, 2014, now Pat. No. 9,549,015.

(51) Int. Cl.
| | |
|---|---|
| *H04L 29/06* | (2006.01) |
| *H04L 12/709* | (2013.01) |
| *H04L 29/08* | (2006.01) |

(52) U.S. Cl.
CPC .......... *H04L 65/607* (2013.01); *H04L 45/245* (2013.01); *H04L 65/4069* (2013.01); *H04L 69/324* (2013.01)

(58) Field of Classification Search
CPC ..................................................... H04L 65/607
See application file for complete search history.

(56) References Cited

U.S. PATENT DOCUMENTS

| | | | | |
|---|---|---|---|---|
| 6,553,072 B1 * | 4/2003 | Chiang | ................. | H04N 19/37 |
| | | | | 375/240.25 |
| 6,674,796 B1 * | 1/2004 | Haskell | ........... | H04N 21/23418 |
| | | | | 348/385.1 |

(Continued)

FOREIGN PATENT DOCUMENTS

| | | |
|---|---|---|
| CN | 103269475 A | 8/2013 |
| EP | 1519581 | 3/2005 |

OTHER PUBLICATIONS

PCT International Search Report and Written Opinion, PCT Application No. PCT/US2015/021333, dated Jun. 15, 2015, 14 pages.

(Continued)

*Primary Examiner* — Jay P Patel  
(74) *Attorney, Agent, or Firm* — Fenwick & West LLP

(57) ABSTRACT

A transmitter and receiver for communication of multimedia streams across a multi-lane communications link. The transmitter packetizes multimedia streams according to a link layer protocol and distributes the packets across multiple lanes of a communications link. The entire packet, including the header and payload, can be distributed across the lanes in an ordered sequence to increase utilization of the communication lanes. The transmitter may also packetize multiple multimedia streams and intermix the packets across the lanes of the communication lane. The receiver extracts the packets that are distributed across the multiple lanes and decodes the packets into the multimedia streams.

16 Claims, 8 Drawing Sheets

(56) References Cited

U.S. PATENT DOCUMENTS

| | | |
|---|---|---|
| 6,914,637 B1 | 7/2005 | Wolf et al. |
| 7,782,805 B1 | 8/2010 | Belhadj et al. |
| 8,266,311 B2 | 9/2012 | Virdi et al. |
| 2002/0001041 A1* | 1/2002 | Sezaki ............... G06F 3/1423 348/385.1 |
| 2006/0171392 A1* | 8/2006 | Jen ................... H04L 29/06027 370/392 |
| 2006/0239294 A1* | 10/2006 | Wogsberg ............... H04N 7/01 370/466 |
| 2008/0266384 A1* | 10/2008 | Triplicane ............. H04M 3/565 348/14.09 |
| 2009/0154894 A1* | 6/2009 | Wei ................. H04N 21/44021 386/335 |
| 2010/0091887 A1* | 4/2010 | Folea ................ H04L 63/0428 375/240.26 |
| 2011/0287724 A1* | 11/2011 | Noh ....................... H04H 20/61 455/77 |
| 2012/0008768 A1* | 1/2012 | Mundra ................ H04L 9/0637 380/28 |
| 2012/0167149 A1* | 6/2012 | Toba ................ H04N 21/43615 725/85 |
| 2013/0195218 A1 | 8/2013 | Whitby-Strevens |
| 2014/0056370 A1 | 2/2014 | Chang |
| 2014/0293135 A1* | 10/2014 | Shao ................ H04N 21/43632 348/634 |
| 2015/0295978 A1* | 10/2015 | Yi ......................... H04L 65/607 370/474 |

OTHER PUBLICATIONS

"High-Definition Multimedia Interface Specification Version 1.3a," Hitachi Ltd. et al., HDMI Licensing, LLC, Nov. 10, 2006, 276 pages.

U.S. Office Action, U.S. Appl. No. 14/253,808, dated May 2, 2016, 8 pages.

U.S. Office Action, U.S. Appl. No. 14/253,808, dated Oct. 13, 2015, 11 pages.

Chinese First Office Action, Chinese Application No. 201580008912.6, dated Apr. 25, 2017, 7 pages (with concise explanation of relevance).

* cited by examiner

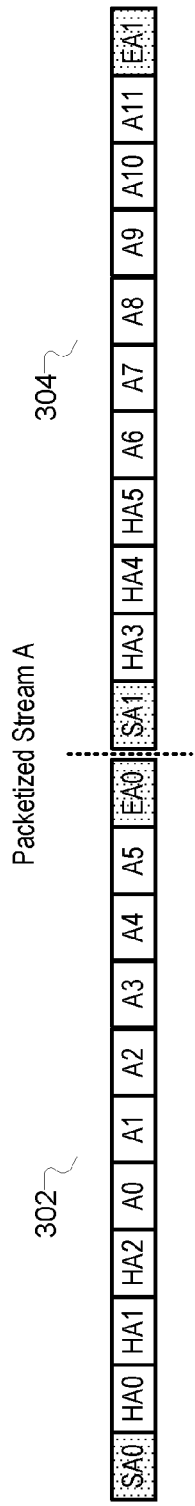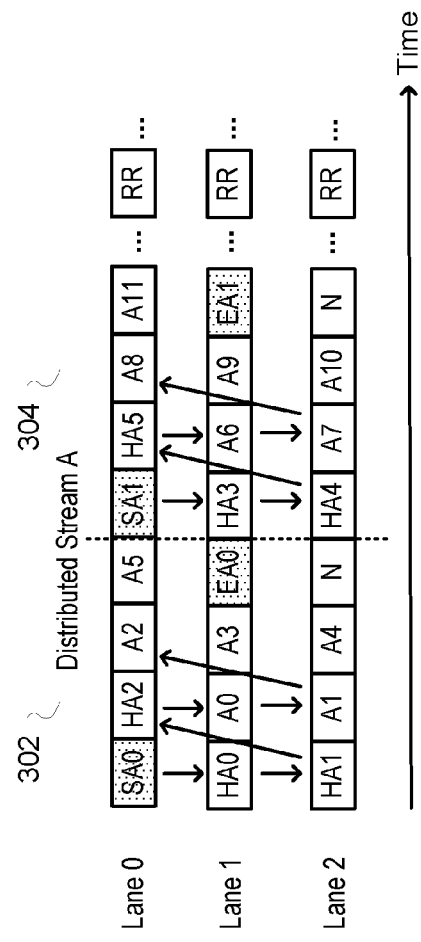

COMMUNICATION OF MULTIMEDIA DATA STREAMS OVER MULTIPLE COMMUNICATION LANES

CROSS REFERENCE TO RELATED APPLICATIONS

This application is a continuation of U.S. application Ser. No. 14/253,808 filed Apr. 15, 2014, which is incorporated by reference in its entirety.

BACKGROUND

1. Field of the Disclosure

This disclosure pertains in general to data communications, and more specifically to communication of multimedia data streams over multiple communication lanes.

2. Description of the Related Art

Video and audio data is typically transferred from one device to another across using communication links such as the high definition multimedia interface (HDMI) or the mobile high definition link (MHL). MHL only allows the transfer of AV stream over one communication lane. As video resolution increases from 1080p to 4 k, 8 k and higher, one communication lane is no longer sufficient to support the bandwidth requirement of the video. Additionally, even if multiple communications lanes are used to transfer the video, there may still not be sufficient bandwidth to transfer high resolution video if the lanes are not utilized efficiently.

SUMMARY

Embodiments of the present disclosure are related to a transmitter and receiver for multimedia communications over a multi-lane multimedia communications link in a manner that increases usage of available bandwidth on the communications link.

In one embodiment, a transmitter for multimedia communications across a multimedia communication link is disclosed. The transmitter comprises a first packet encoding circuit to packetize a first multimedia stream with a link layer protocol into a plurality of first stream packets, each first stream packet including a respective first header and a respective first payload. The transmitter also comprises circuitry to distribute the first stream packets across a plurality of communication lanes of the communication link. The circuitry distributes the respective first header and the respective first payload of each first stream packet across the plurality of communication lanes in ordered sequence of the communication lanes.

In one embodiment, the transmitter further comprises a second packet encoding circuit to packetize a second multimedia stream with a link layer protocol into a plurality of second stream packets, each second stream packet including a respective second header and a respective second payload for the second multimedia stream. The circuitry distributes the second stream packets across the plurality of communication lanes and intermixes the first stream packets with the second stream packets. The circuitry also distributes the respective second header and respective second payload of each second stream packet across the plurality of communication lanes in ordered sequence of the communication lanes.

In one embodiment, a receiver for multimedia communications across a multimedia communication link is disclosed. The receiver comprises circuitry to receive data for first stream packets from a plurality of communication lanes of the communication link and to extract the first stream packets from the data for the first stream packets. Each first stream packet includes a respective header and a respective payload, data for the respective first header and the respective first payload of each first stream packet being distributed across the plurality of communication lanes in ordered sequence of the communication lanes. The receiver also comprises a first packet decoding circuit to decode the first stream packets with a link layer protocol into a first multimedia stream.

In one embodiment of the receiver, the circuitry receives data for second stream packets and extracts the second stream packets from the data for the second stream packets, the data for the second stream packets intermixed with the data for the first stream packets. Each second packet includes a respective second header and a respective second payload, data for the respective second header and the respective second payload of each second stream packet being distributed across the plurality of communication lanes in ordered sequence of the communication lanes. The receiver also comprises a second packet decoding circuit to decode the second stream packets into a second multimedia stream.

In another embodiment, a non-transitory computer-readable medium stores a representation of the transmitter or the receiver.

BRIEF DESCRIPTION OF THE DRAWINGS

The teachings of the embodiments disclosed herein can be readily understood by considering the following detailed description in conjunction with the accompanying drawings.

FIG. 3A is an illustration of a single multimedia data stream, according to one embodiment.

FIG. 3B is an illustration of a packetized multimedia data stream, according to one embodiment.

FIG. 3C is an illustration of a packetized multimedia data stream distributed across multiple communication lanes, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure include a transmitter and receiver for communication of multimedia streams across a multi-lane communications link. The transmitter packetizes multimedia streams and distributes the packets across multiple lanes of a communications link. The entire packet, including the header and payload, can be distributed across the lanes in an ordered sequence to increase utilization of the communication lanes. The transmitter may also packetize multiple multimedia streams and intermix the packets across the lanes of the communication lane. The receiver extracts the packets that are distributed across the multiple lanes and decodes the packets into the multimedia streams.

Figure 1:
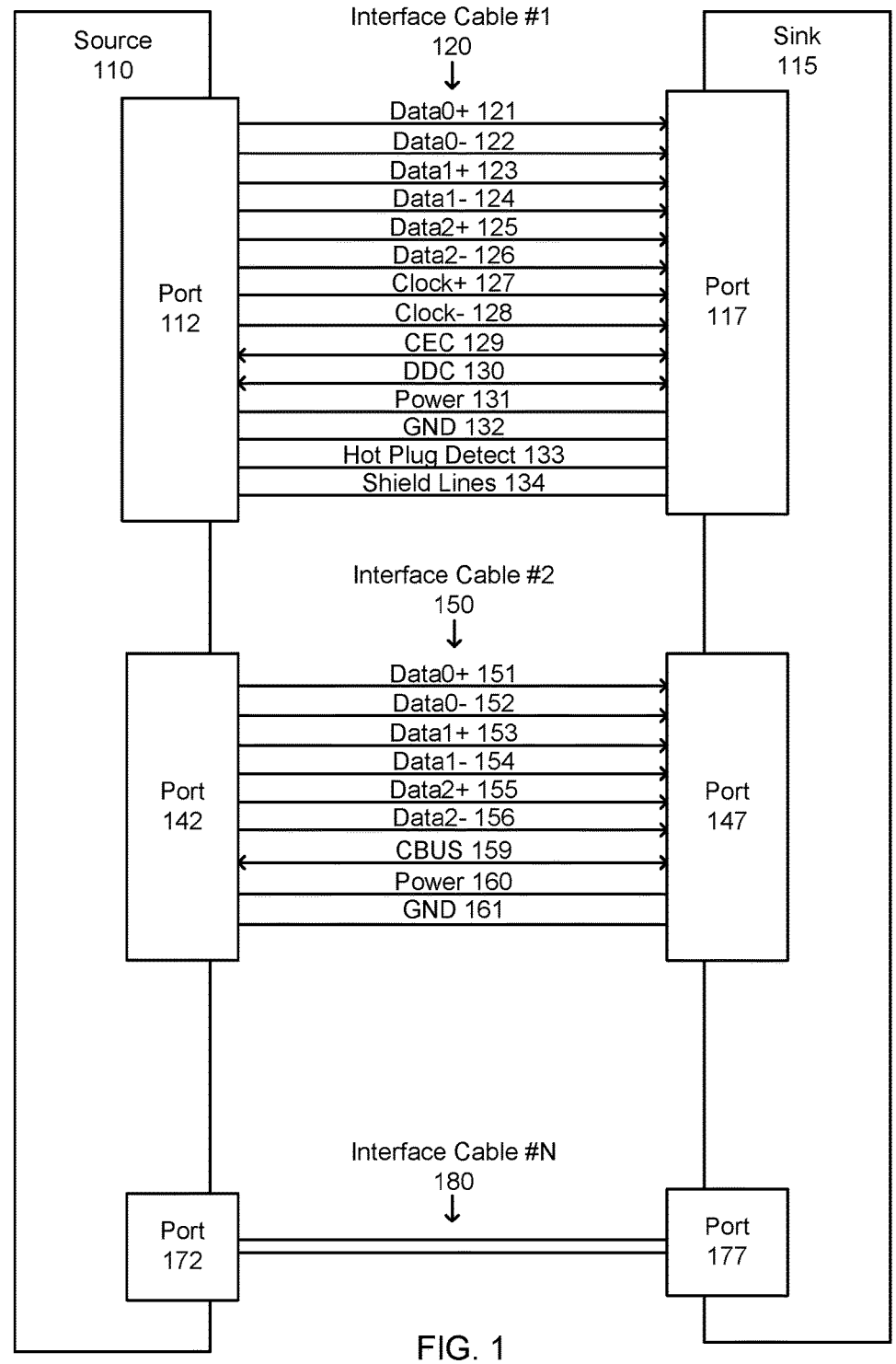
FIG. 1 is a high-level block diagram of a system for multimedia data communications, according to one embodiment.

FIG. 1 is a high-level block diagram of a system 100 for multimedia data communications, according to one embodiment. The system 100 includes a source device 110 communicating with a sink device 115 through one or more interface cables (e.g., 120, 150, 180). Source device 110 transmits multimedia data to the sink device 115 and also exchanges control data with the sink device 115 through the interface cables (e.g., 120, 150, 180). Examples of source device 110 include mobile phones, blu-ray players, gaming consoles, laptop computer, and tablet computers. Examples of sink device 115 include televisions and display devices. In one embodiment, source device 110 and/or sink device 115 may be repeater devices.

Source device 110 includes physical communication ports (e.g., 112, 142, 172) coupled to the interface cables (e.g., 120, 150, 180). Sink device 115 also includes physical communication ports (e.g., 117, 147, 177) coupled to the interface cables (e.g., 120, 150, 180). Signals exchanged between the source device 110 and the sink device 115 across the interface cables (e.g., 120, 150, 180) pass through the physical communication ports (e.g., 117, 147, 177).

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 844 for the differential signals. In some embodiments, the sink device 115 may utilize the CEC control bus 129 for the transmission of closed loop feedback control data to source device 110.

In one embodiment, interface cable 150 represents a Mobile High-Definition Link (MHL) cable. The MHL cable 150 supports differential signals transmitted via data0+ line 151, data0− line 152, data1+ line 153, data1− line 154, data2+ line 155 and data2− line 156. Embedded common mode clocks are transmitted through the differential data lines. The MHL cable 150 may further include a control bus (CBUS) 159, power 160 and ground 161. The CBUS 159 carries control information such as discovery data, configuration data and remote control commands.

Embodiments of the present disclosure relate to transmission of multimedia streams across a communications link with multiple communication lanes, such as the MHL cable 150. Each differential pair of data lines (e.g., 151/152) can be considered a logical communication lane that carries a single bit of multimedia data at a time. The source device 110 packetizes multimedia streams and distributes the packetized streams across the communication lanes for transmission to the sink device 115. The sink device 115 receives the distributed packets, extracts the packets, and decodes the packets into multimedia streams.

In one embodiment, a representation of the source device, the sink device, or components within the source device or sink device may be stored as data in a non-transitory computer-readable medium (e.g. hard disk drive, flash drive, optical drive). These descriptions may be behavioral level, register transfer level, logic component level, transistor level and layout geometry-level descriptions.

Source Device

Figure 2:
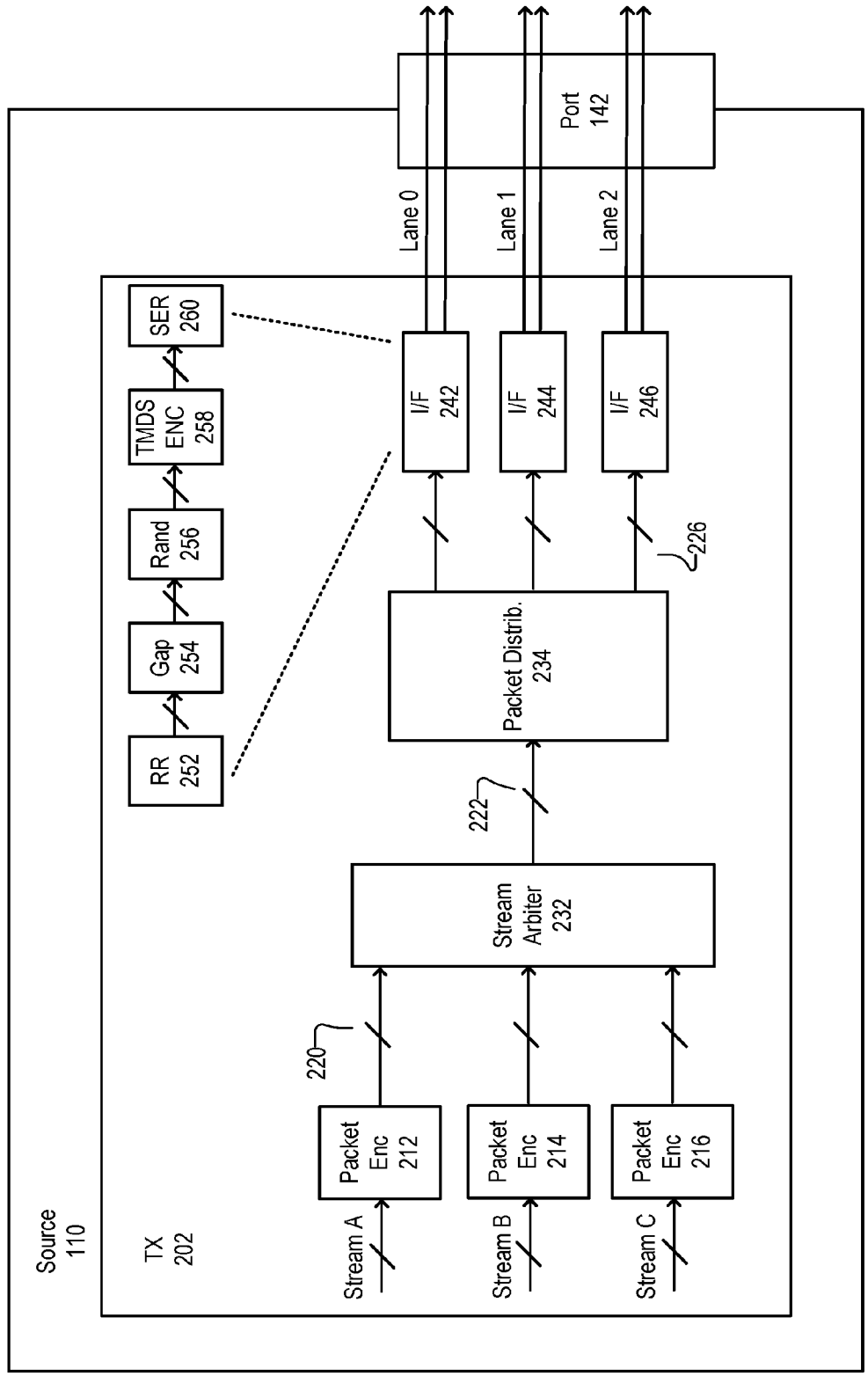
FIG. 2 is a block diagram of a source device, according to one embodiment.

FIG. 2 is a block diagram of a source device 110, according to one embodiment. The source device 110 includes a transmitter 202 that packetizes multimedia streams (Stream A, Stream B, Stream C) and distributes the packetized stream across the communication lanes (Lane 0, Lane 1, Lane 2). The distributed packets are transmitted to the sink device 115 through the communication lanes via port 147. The transmitter 202 may be an integrated circuit or other electronic device that complies with a version of the MHL or other multimedia standard. As shown, the transmitter 202 includes packet encoders 212, 214, 216, a stream arbiter 232, packet distributor 234, and lane interfaces 242, 244 and 246. The packet encoders perform link layer functions, whereas the stream arbiter 232, packet distributor 234 and lane interfaces 242, 244 and 246 perform physical layer functions to convert packets into electrical signals for transmission.

Each packet encoder 212, 214 and 216 receives a respective multimedia stream (Stream A, Stream B, Stream C). The multimedia streams mat be received from an internal interface or a legacy interface (e.g., HDMI, DVI). A multimedia stream may include video data, audio data or audiovisual data. Specific examples of data in a multimedia stream for MHL include video pixel data, video timing data (e.g., horizontal sync, vertical sync, data enable) and audio sample data. A multimedia stream may also include auxiliary data for the video and audio data. Examples of auxiliary data include infoframes (e.g., AVI-info, Audio-info, MPEG-source-info), audio content related information (e.g., audio content protection) or colorimetry related information (e.g., gamut metadata). Each multimedia stream represents a piece of multimedia content that is separate and distinct from the multimedia content of the other data streams. For example, Stream A can be a 1080p resolution video, Stream B can be another 1080p resolution video, and Stream C can be a 2060p resolution video.

Each packet encoder 212, 214 and 216 generates multimedia stream packets from its respective multimedia stream. Specifically, packet encoder 212 converts Stream A into multimedia stream packets for Stream A. Packet encoder 214 converts Stream B into multimedia stream packets for Stream B. Packet encoder 216 converts StreamC into multimedia stream packets for Stream C. The packets are output from the packet encoders 212, 214 and 216 in the form of one or more signals 220. Only three multimedia streams are shown in FIG. 2, and in other embodiments there may be a larger number of multimedia streams.

Each packet includes a series of 8-bit characters for the start of the packet, the header, the payload and the end of the packet. The header, start of packet, payload, and end of packet are generated in accordance with the rules of a link layer packet encoding protocol. The format of the packets will be explained in greater detail by reference to FIG. 3B, FIG. 4B, and FIG. 5B.

Stream arbiter 232 receives the multimedia stream packets from the different packet encoders 212, 214, 216 and places the packets onto a single pipeline. If there are multiple data streams, the data stream packets become intermixed in the pipeline. In other words, if there are two incoming multimedia streams A and B, the pipelined packets may alternate over time between packets for Stream A and packets for Stream B. The pipelined packets are then output from the stream arbiter 232 in the form of one or more signals 222.

Packet distributor 234 receives the pipelined packets from the stream arbiter 232 and distributes the characters of the packets across the different lane interfaces 242, 244 and 246. The characters are distributed across the lane interfaces 242, 244 and 246 in a sequential and repeating order of the communication lanes. The packet distributor 214 may be formed from de-multiplexers having a control input that is incremented with each character of the pipelined packets. The distribution of packets will be explained in greater detail by reference to FIGS. 3C, 4C and 5C. The distributed packets are transmitted to the lane interfaces 242, 244 and 246 in the form of one or more signals 226. As each communication lane has its own lane interface 242, 244 and 246, distributing the packets to the lane interface 242, 244 and 246 effectively distributes the packets across the communication lanes.

Lane interfaces 242, 244 and 246 perform additional post-processing of the distributed packets before transmitting the distributed packets across the communication lanes. In one embodiment, each lane interface 242, 244 and 246 includes a randomizer reset generator 252, a gap filler 254, a randomizer 256, a transition minimized differential signaling (TMDS) encoder 258, and a serializer 260.

The randomizer reset generator 252 inserts a randomized reset character in the distributed packet stream on all communication lanes. The randomized reset character is inserted on a periodic basis between or within packets. The randomizer reset character resets the randomizer 256, and also instructs the sink device 115 to reset its de-randomization logic, which ensures that the randomizer 256 of the source device 110 is synchronized to the de-randomization logic of the sink device 115. The randomizer reset character is also used by the sink device 115 for lane alignment, as will later be explained by reference to FIG. 6.

The gap filler 254 fills gaps in the distributed packet stream at the output of the randomizer reset generator 252 with padding characters. The distribution technique used by the packet distributor 234 can leave gaps where, for a point in time, some lanes are assigned characters but other lanes do not have any characters. The gap filler circuit 254 fills these gaps with padding characters. Also, if a multimedia stream has low bandwidth requirements, there may be stretches of time where no packets need to be sent. These periods of time are also filled with padding characters.

The randomizer 256 randomizes the distributed packet stream at the output of the gap filler 254 by XORing the packets with a randomizer value. The randomizer 256 resets the randomizer value whenever it encounters a randomizer reset character. In one embodiment the randomizer 256 randomizes headers, payloads and padding characters but not other characters such as randomizer reset characters, start of packet characters, and end of packet characters.

The TMDS encoder 258 converts 8 bit characters (e.g., headers, payload) in the distributed packet stream at the output of the randomizer 256 into 10 bit TMDS characters for DC balance. The serializer 260 then serializes the 10 bit TMDS characters of the distributed packet stream at the output of the TMDS encoder 258 into serial signals for transmission over the differential pairs of the communication lanes.

Single Data Stream

In one embodiment, the transmitter 202 may operate with only a single multimedia stream. This embodiment is now explained by reference to FIG. 3A-3C. In FIG. 3A-3C, it is assumed that only Stream A is present and Stream B and Stream C are not present.

FIG. 3A is an illustration of a single multimedia stream before packetization, according to one embodiment. The Stream A includes 12 bytes A0-A11 of raw multimedia data at the input to the packet encoder 212. Stream A may represent, for example, a high resolution 2060p video. Only 12 bytes of Stream A are shown in the figure for ease of illustration. In other embodiments Stream A can have a much larger number of bytes.

FIG. 3B is an illustration of a packetized multimedia stream, according to one embodiment. The packetized multimedia stream represents the output of the packet encoder circuit 212. There are two packets shown in FIG. 3B that are generated from Stream A. The first packet 302 includes characters SA0, HA0-HA2, A1-A5 and EA0. The second packet 304 includes characters SA1, HA3-HA5, A6-A11 and EA1. Each character represents a byte (i.e. 8 bits) of information.

Each packet includes a start of packet character, header characters, payload characters, and an end of packet character. Characters starting with the letter "S" are start of packet characters. A start of packet character (e.g., SA0) indicates the start of the packet. Characters starting with the letter "H" are part of the header. Header characters (e.g., HA0-HA2) include control information describing the contents of the packet, such as an identification of the specific multimedia stream associated with the packet. Characters starting with the letter "A" are part of the payload. Payload characters (e.g. A0-A5) includes multimedia data from a corresponding multimedia stream. Characters staring with the letter "E" are end of packet characters. The end of packet character (e.g., EA0) indicates the end of the packet.

FIG. 3C is an illustration of a packetized multimedia stream distributed across multiple communication lanes, according to one embodiment. The distributed multimedia stream in FIG. 3C represents the final output of the transmitter 202 that appears on the communication lanes.

The packet distributor 234 generally distributes the characters of each packet across the communication lanes (via the lane interfaces 242, 244 and 246) in a predetermined and ordered sequence. The sequence starts with Lane 0, then moves to the next Lane 1, then moves to the last Lane 2. After the last Lane 2 is reached, the sequence repeats and Lane 0 is used again. The start of packet is always transmitted on Lane 0. The gap filler 254 fills gaps after the end of a packet on lanes that do not have a character with padding characters. Padding characters are inserted into remaining lanes after the end of a packet until the lane selection returns to Lane 0.

For example, for packet 302, the start of packet character SA0 is first placed onto Lane 0. The header characters HA0-HA2 are then distributed across the communication lanes in sequence, with one header character being assigned to each communication lane. Header character HA0 is placed on Lane 1, header character HA1 is placed on Lane 2, and header character HA2 is placed on Lane 0. The payload characters A0-A5 are then distributed across the communication lanes in sequence. The end of packet character EA0 follows the payload characters on Lane 1. A padding character N is also placed in Lane 2 to fill the gap in Lane 2 that follows the end of packet EA0. The padding character ensures that the next packet 304 begins in Lane 0.

For packet 304, the start of packet character SA1 is first placed onto Lane 0. The header characters HA3-HA5 are then distributed across the communication lanes, with one header character being assigned to each communication lane in sequence of the communication lanes. Header character HA3 is placed on Lane 1, header character HA4 is placed on Lane 2, and header character HA5 is placed on Lane 0. The payload characters A6-A11 are then distributed across the communication lanes in sequence. The end of packet character EA1 follows the payload characters on Lane 1. A padding character N is transmitted after the end of packet character to fill the gap in Lane 2.

Distributing entire packets across the communication lanes maximizes bandwidth usage when there are multiple communication lanes. Each packet character (e.g., start of packet SA0, header HA0-HA2, payload A0-A5, and end of packet EA0) is transmitted a single time on one of the communication lanes. This avoids duplicative transmission of characters on multiple lanes, which would result in a large waste of bandwidth. Additionally, by keeping the start of packet characters (e.g., SA0, SA1) for all packets on a single lane (e.g., Lane 0), the logic for extracting the packets at the sink device 115 can be simplified.

FIG. 3C also shows a randomizer reset character RR placed on each of the communication lanes. The randomizer reset character RR is placed between the multimedia packets on a periodic basis. The randomizer reset character RR resets the randomizer 252, and also resets the de-randomization logic in the sink device 115. The randomizer reset characters RR may be aligned with each other and transmitted across the communication lanes at the same time. Additionally, if randomization and TMDS are used, the characters in FIG. 3C may be randomized 10 bit TMDS characters that correspond to the 8 bit characters of FIG. 3B.

Distributing Multiple Data Streams

Figure 4A:
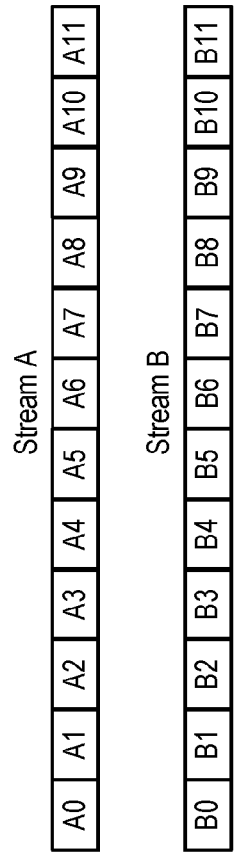
FIG. 4A is an illustration of two multimedia data streams, according to one embodiment.
Figure 4B:
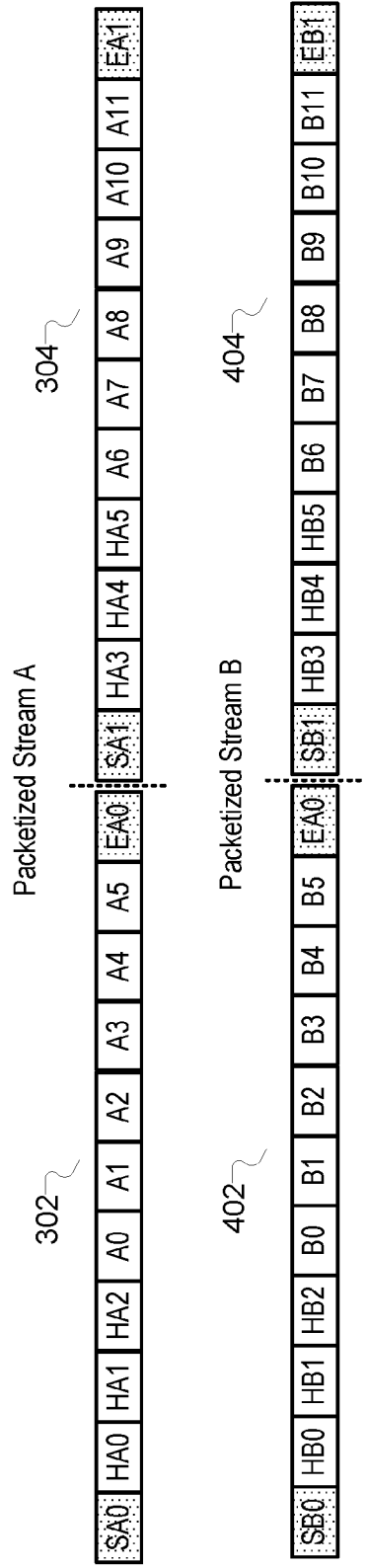
FIG. 4B is an illustration of two packetized multimedia data streams, according to one embodiment.
Figure 4C:
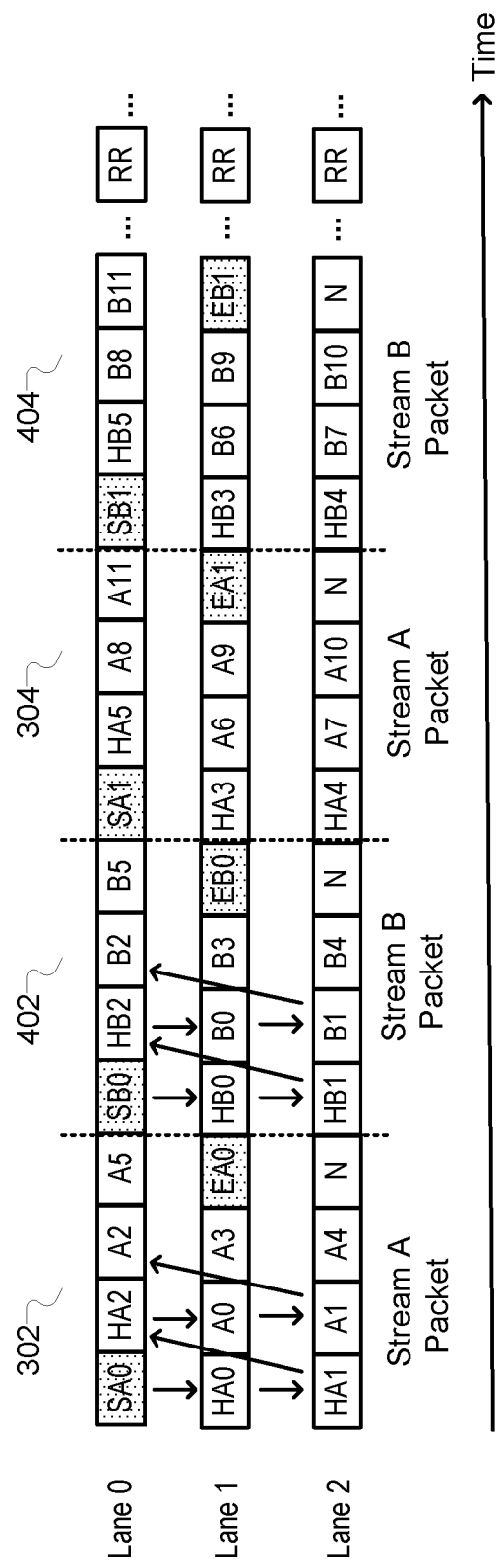
FIG. 4C is an illustration of two packetized multimedia data streams distributed across multiple communication lanes and intermixed with each other, according to one embodiment.

In one embodiment, the transmitter 202 may operate with multiple multimedia streams. This embodiment is now explained by reference to FIG. 4A-4C. In FIG. 4A-4C, it is assumed that Stream A and Stream B are present and Stream C is not present.

FIG. 4A is an illustration of a two multimedia streams before packetization, according to one embodiment. FIG. 4A is similar to FIG. 3A except there is now an additional Stream B. Stream B includes 12 bytes B0-B11 of raw multimedia data that are received by the packet encoder 214. Stream B may have more or less multimedia data than Stream A, for example, depending on whether the video of Stream B has a higher or lower resolution than the video of Stream A.

FIG. 4B is an illustration of two packetized multimedia streams, according to one embodiment. FIG. 4B is similar to FIG. 3B except there is now an additional packetized stream B. Packetized stream B represents the output of packet encoder 214.

Packetized stream B includes two packets that are generated from Stream B. The first packet 402 includes start of packet character SB0, header characters HB0-HB2, payload characters B0-B5 and end of packet character EB0. The second packet 404 includes start of packet character SB1, header characters HB3-HB5, payload characters B6-B11 and end of packet character EB1.

FIG. 4C is an illustration of two packetized multimedia streams distributed across multiple communication lanes, according to one embodiment. The distributed multimedia stream in FIG. 4C represents the output of the transmitter 202 that appears on the communication lanes.

FIG. 4C is similar to FIG. 3C except there are now packets from Stream B intermixed over time with packets from Stream A. The packets for the different streams are multiplexed onto the communication lanes and interleaved with each other over time in different time slots. Packet 302 from Stream A is first distributed across the communication lanes in ordered sequence of the communication lanes. Then Packet 402 from Stream B is distributed across the communication lanes in ordered sequence of the communication lanes after packet 302 from Stream A. Packet 304 from Stream A is then distributed across the communication lanes.

The packets may be intermixed in alternating order over time as shown in FIG. 4C. In other embodiments, the intermixing of the packets may be in a different order. For example, if Stream A is a video that has double the resolution of the video of Stream B, one Stream B packet may be transmitted for every two Stream A packets.

Intermixing packets from different multimedia streams also increases utilization of bandwidth when there are multiple streams to be transferred over multiple communication lanes. The only wasted bandwidth is in the null characters N, and the number of null characters N can be insignificant if the size of the payload is sufficiently large.

Mixed Mode Distribution of Multimedia Streams

Figure 5A:
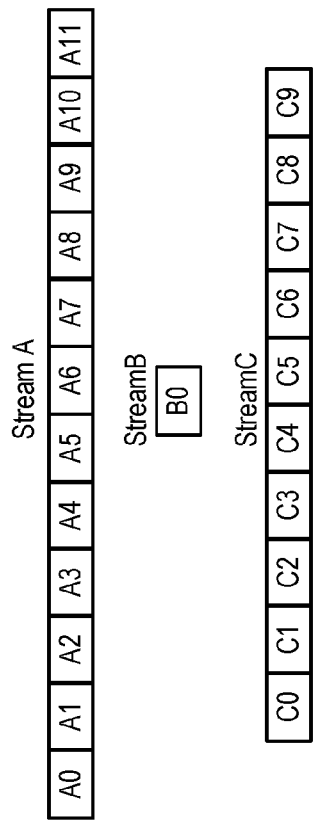
FIG. 5A is an illustration of three multimedia data streams, according to one embodiment.
Figure 5B:
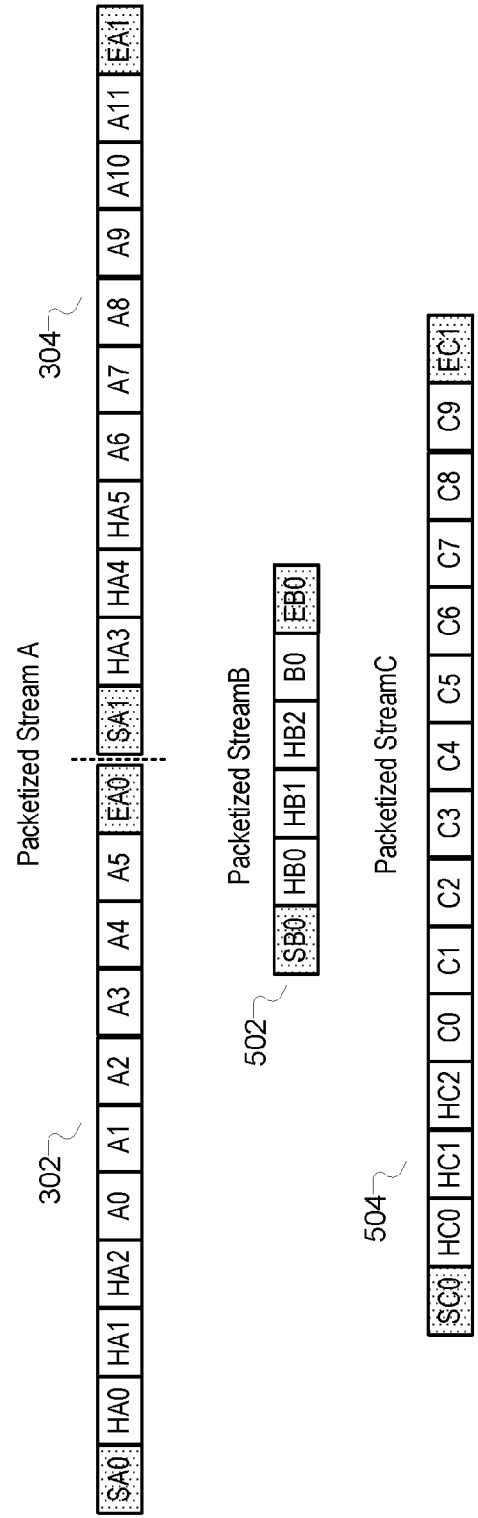
FIG. 5B is an illustration of three packetized multimedia data streams, according to one embodiment.
Figure 5C:
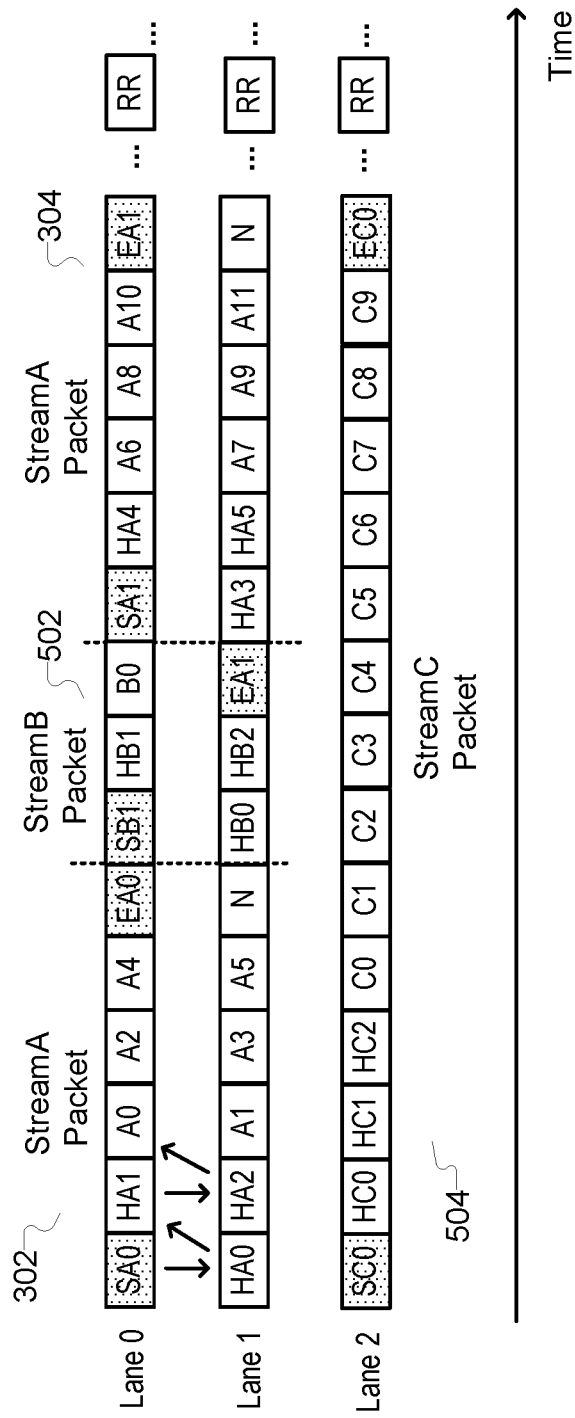
FIG. 5C is an illustration of three packetized multimedia data streams distributed across multiple communication lanes, according to one embodiment.

In one embodiment, the transmitter 202 may operate with multiple multimedia streams and distribute some of the streams across some of the communication lanes, while sending one of the multimedia streams over its own dedicated lane. This embodiment is now explained by reference to FIG. 5A-5C. In FIG. 5A-5C, it is assumed that Stream A, Stream B and Stream C are present.

FIG. 5A is an illustration of three multimedia data streams, according to one embodiment. FIG. 5A is similar to FIG. 4A except there is now an additional Stream C. Stream C includes 12 bytes C0-C9 of raw multimedia data that are received by the packet encoder 216. Multimedia Stream B is also shortened to 1 byte of raw multimedia data. For example, Stream A may represent a 1080p video, Stream C may represent a 720p video, and Stream B may represent a 240p video.

FIG. 5B is an illustration of three packetized multimedia data streams, according to one embodiment. FIG. 5B is similar to FIG. 4B except there is now an additional packetized stream C and packetized stream B is shorter.

Packetized stream B includes a single packet 502 with a single payload character B0. Packetized stream C represents the output of packet encoder circuit 216. Packetized stream C includes a single packet 504 that is generated from Stream C. The packet 502 includes start of packet character SC0, header characters HC0-HC2, payload characters C1-C9 and end of packet character EC0.

FIG. 5C is an illustration of three packetized multimedia data streams distributed across multiple communication lanes, according to one embodiment. The multimedia streams in FIG. 5C represents the output of the transmitter 202 that appears on the communication lanes.

The packets for Stream A and Stream B are intermixed with each other in alternating manner on Lane 0 and Lane 1.

The packet 302 from Stream A is distributed in sequentially repeating order across Lane 0 and Lane 1. The start of packet character SA0 is placed on Lane 0. The header characters HA0-HA2 are distributed across both Lane0 and Lane 1. The payload characters A0-A5 are distributed across both Lane 0 and Lane 1.

The packet 502 from Stream B is also distributed across Lane 0 and Lane 1 after packet 302. The start of packet character SB0 is placed on Lane 0. The header characters HB0-HB2 are distributed across both Lane0 and Lane 1. The payload character B0 is placed on Lane 0.

The packet 302 from Stream A is then distributed in sequentially repeating order across Lane 0 and Lane 1. The start of packet character SA1 is placed on Lane 0. The header characters HA3-HA5 are distributed across both Lane0 and Lane 1. The payload characters A6-A11 are distributed across both Lane 0 and Lane 1.

The packets for Stream C are not intermixed with the packets for Stream A and Stream B. Lane 2 is dedicated to Stream C such that only Stream C is transmitted across Lane 2. Thus, the characters of packet 504 of Stream C are transmitted on Lane 2.

This mode of operation shown in FIG. 5C is beneficial when there are different multimedia streams of different resolutions being transmitted across multiple lanes. The mode may also be beneficial when some streams are already being transmitted across some of the lanes, and the transmitter wants to add additional streams. Instead of changing the lane configuration and interrupting the current streams, the additional stream can just be transmitted across one of the open lanes to prevent any interruption. The mode may also be beneficial when one stream has very large packets that would cause jitter if intermixed with packets from other streams.

In one embodiment, the packet distributor 234 receives one or more mode control signals (not shown) indicating which mode to operate in. The packet distributor 234 then distributes the packets to the lane interfaces 242, 244, 246 according to the selected mode of operation. For example, all streams may be intermixed as shown in FIG. 4C, or some streams can be separated from the other streams as shown in FIG. 5C.

In one embodiment, the source device 110 and sink device 115 can agree on whether to use the mixed-mode of operation in FIG. 5C or the distributed mode of operation in FIG. 5B in advance by communicating through the control bus 159 (FIG. 1) prior to packetization and distribution of the multimedia streams.

Sink Device

Figure 6:
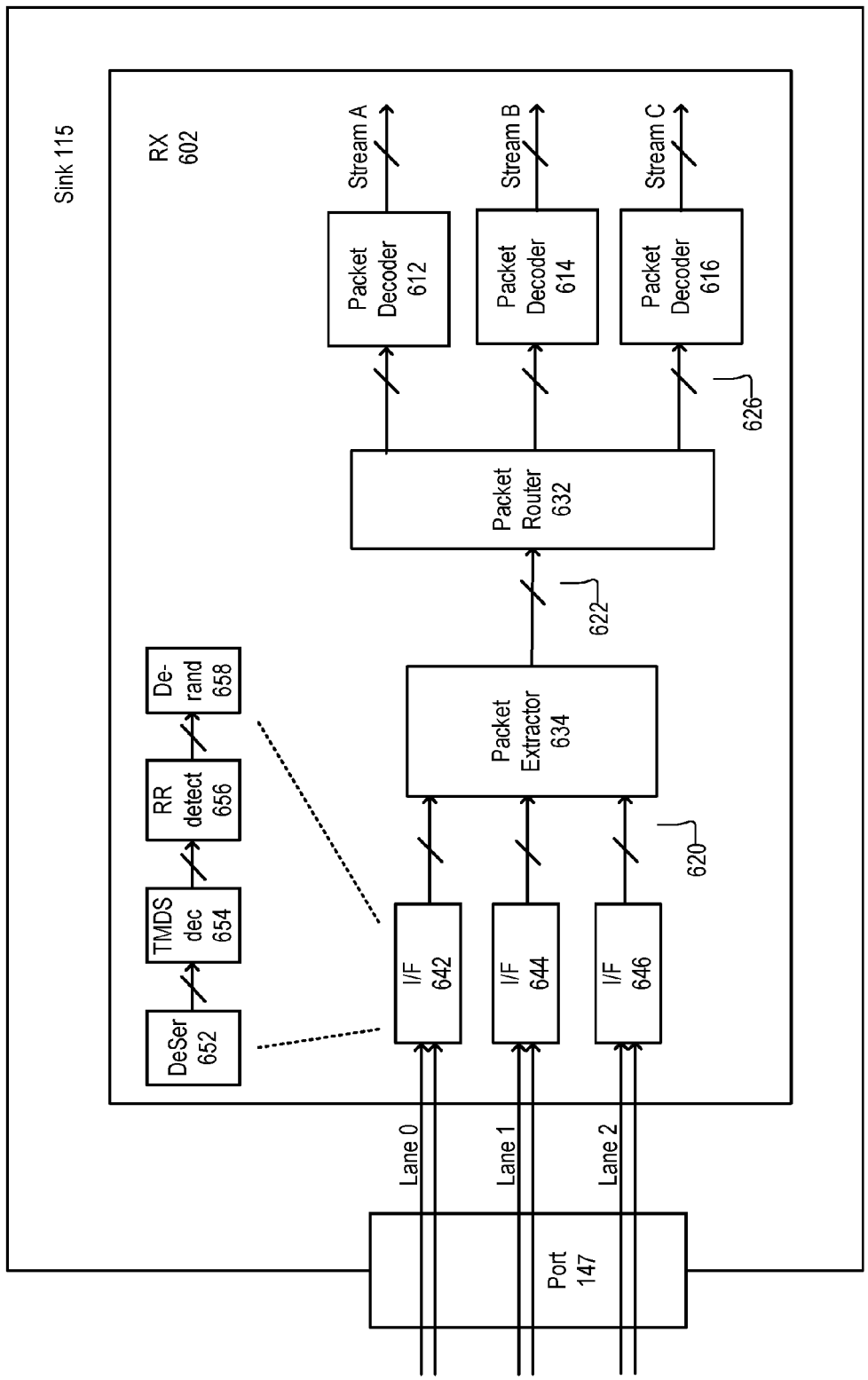
FIG. 6 is a block diagram of a sink device, according to one embodiment.

FIG. 6 is a block diagram of a sink device 115, according to one embodiment. The sink device 110 includes a receiver 602 that receives data for packets that are distributed across the communication lanes (Lane 0, Lane 1, Lane 2) via port 147. The receiver 602 decodes the packets into multimedia streams (Stream A, Stream B, Stream C). The receiver 602 may be an integrated circuit or other electronic device that complies with a version of MHL or other multimedia standard. The operation of the receiver 602 is substantially opposite to that of the transmitter 202 because the receiver 602 is decoding packets into multimedia streams instead of encoding multimedia streams into packets. As shown, the receiver 602 includes lane interfaces 642, 644, 646, packet extractor 634, packet router 632 and packet decoders 612, 614, 616. The lane interfaces 642, 644, 646, packet extractor 634 and packet router 632 perform physical layer functions to convert electrical signals received via the communication lanes into packets, whereas the packet decoder 612, 614, 616 perform link layer functions to decode the packets.

Lane interfaces 642, 644 and 646 perform pre-processing of the incoming distributed packets before passing the distributed packets to the packet extractor 634 using signals 620. In one embodiment, each lane interface includes a de-serializer 652, a TMDS decoder 654, a randomizer reset detector 656 and a de-randomizer 658.

The de-serializer 652 receives data for the distributed packets in the form of serial signals, which it converts into parallel signals. The TMDS decoder 654 receives the data for the distributed packets from the output of the de-serializer 652 and converts 10 bit TMDS characters (e.g., headers, payload) of the packets into 8-bit characters.

The randomizer reset detector 656 receives data for the distributed packets from the output of the TMDS decoder 654 and attempts to detect a randomizer reset character in data. The de-randomizer 658 de-randomizes the data for the distributed packets by applying a de-randomization value to the packet characters. If a randomizer reset character was detected by the randomizer detector 656, the de-randomizer 658 resets its de-randomization value.

In one embodiment, the randomizer reset detector 656 also uses the randomizer reset characters for lane alignment. Different communication lanes may have different traveling times due to length mismatch, geometry mismatch, etc. Due to these different traveling times, the data received by the receiver 602 may be skewed. The randomizer reset detector 656 can detect skews among lanes by measuring the time difference between randomizer reset characters and compensate for the skews by controlling a delay parameter for each lane until the data is time-aligned.

Packet extractor 634 receives data for the distributed packets from the outputs of the de-randomizers 658 and extracts the packets from the data. The packet extractor 634 can extract the packets by re-ordering the distributed data into a pipeline of packets. The packet extractor 634 looks for start of packet characters on Lane 0 from lane interface 642 that signal the start of a packet. The packet extractor 634 then reconstructs packets by assuming that the packet characters are distributed in sequential and repeating order across the communication lanes. The packet extractor 634 ignores padding characters that follow the end of packet character. The output of the packet extractor 634 is one or more signals 622 that represent a pipeline of packets.

For example, referring to FIGS. 3B and 3C, the packet extractor 634 can receive the Distributed Stream A from FIG. 3C and then generate Packetized Stream A as shown in FIG. 3B. Similarly, packet extractor 634 can receive the distributed streams of FIG. 4C or 5C and generate the packetized streams of FIG. 4B or 5B, respectively.

Packet router 632 receives the pipelined packets from the packet extractor 634 and routes the packets to their appropriate packet decoders 612, 614 and 616. Packet router 632 reads the stream identification in the header of each packet to determine the appropriate destination of the packet. For example, if a packet header includes the identification of stream A, the packet is routed to packet decoder 612. If the packet header includes the identification of stream B, the packet is routed to packet decoder 614. Each packet is handled on an individual basis to determine the proper destination for the packet. The output of the packet router 632 is one or more signals 626 that represent the packets.

Packet decoders 612, 614, 616 receive packets from their packet router 632 and decode the packets into their respective multimedia streams. Packet decoders 612, 614 and 616 decode the packets using a link layer packet decoding protocol that corresponds to the link layer packet encoding protocol used to create the packets. Specifically, packet decoder 612 converts packets into Stream A. Packet decoder 612 converts packets into Stream B. Packet decoder 616 converts packets into Stream C. The output of the decoders 612, 614 and 616 are one or more signals that represent the multimedia streams. The content of the streams can then be presented (e.g. displayed or converted to audio) by the sink device 115.

Upon reading this disclosure, those of skill in the art will appreciate still additional alternative designs for communication of multimedia streams over multiple communication lanes. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A method for multimedia communications across a communication link, the method comprising:
   packetizing a first multimedia stream with a link layer protocol into a plurality of first stream packets, each first stream packet including a respective first header and a respective first payload; and
   distributing the first stream packets across a plurality of communication lanes of the communication link, the respective first header and the respective first payload of each first stream packet being distributed across the plurality of communication lanes in ordered sequence of the communication lanes.

2. The method of claim 1, further comprising:
   packetizing a second multimedia stream into a plurality of second stream packets, each second stream packet including a respective second header and a respective second payload for the second multimedia stream; and
   distributing the second stream packets across the plurality of communication lanes, wherein the first stream packets are intermixed with the second stream packets, the respective second header and respective second payload of each second stream packet being distributed across the plurality of communication lanes in ordered sequence of the communication lanes.

3. The method of claim 2, further comprising:
   packetizing a third multimedia stream into a plurality of third stream packets,
   wherein the third stream packets are distributed to an additional communication lane of the communication link but not the plurality of communication lanes.

4. The method of claim 2, further comprising:
   inserting an identification of the first multimedia stream in the respective first header of each first stream packet, and
   inserting an identification of the second multimedia stream in the respective second header of each second stream packet.

5. The method of claim 1, further comprising inserting randomizer reset characters periodically between or within at least some of the first stream packets.

6. The method of claim 1, wherein each first stream packet includes a respective start of packet character, and further comprising distributing the respective start of packet character for each stream packet to a same communication lane of the plurality of communication lanes.

7. The method of claim 1, wherein each first stream packet includes a respective end of packet character, and further comprising distributing a padding character to one or more of the communication lanes in gaps after the respective end of packet character.

8. The method of claim 1, further comprising randomizing and applying transition minimized differential signaling encoding to the respective first header and respective first payload of each first stream packet.

9. A method for multimedia communications across a communication link, the method comprising:
   receiving data for first stream packets from a plurality of communication lanes of the communication link and extracting the first stream packets from the data for the first stream packets, each first stream packet including a respective header and a respective payload, data for the respective first header of the respective first payload of each first stream packet being distributed across the plurality of communication lanes in ordered sequence of the communication lanes; and
   decoding the first stream packets with a link layer protocol into a first multimedia stream.

10. The method of claim 9, further comprising:
    receiving data for second stream packets, the data for the second stream packets intermixed with the data for the first stream packets, each second packet including a respective second header and a respective second payload, data for the respective second header and the respective second payload of each second stream packet being distributed across the plurality of communication lanes in ordered sequence of the communication lanes;
    extracting the second stream packets from the data for the second stream packets; and
    decoding the second stream packets into a second multimedia stream.

11. The method of claim 10, further comprising:
    receiving data for third stream packets from an additional communication lane of the communication link but not from the plurality of communication lanes;
    extracting the third stream packets from the data for the third stream packets; and
    decoding the third stream packets into a third multimedia stream.

12. The method of claim 10, further comprising:
    routing each first stream packet to a first packet decoding circuit for first stream packets based on the respective first stream header of the first stream packet; and
    routing each second stream packet to a second packet decoding circuit for second stream packets based on the respective second stream header of the second stream packet.

13. The method of claim 9, further comprising:
    receiving a randomizer reset character via the at least one of the plurality of communication lanes; and
    resetting de-randomization circuitry responsive to receiving the randomizer reset character.

14. The method of claim 9, further comprising controlling a parameter correcting for skew between the communication lanes based on randomizer reset characters received via one or more of the plurality of communication lanes.

15. The method of claim 9, wherein each first stream packet includes a respective start of packet character, and wherein data for each start of packet character is received from a same communication lane of the plurality of communication lanes.

16. The method of claim 9, further comprising de-randomizing and decoding transition minimized differential signaling encoding from the respective header of each first stream packet.

\* \* \* \* \*